(12) United States Patent
Jung

(10) Patent No.: US 7,395,992 B2
(45) Date of Patent: *Jul. 8, 2008

(54) MONITOR STAND

(75) Inventor: Gil Sik Jung, Gumi-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/657,573

(22) Filed: Jan. 25, 2007

(65) Prior Publication Data

US 2007/0158510 A1 Jul. 12, 2007

Related U.S. Application Data

(63) Continuation of application No. 11/078,409, filed on Mar. 14, 2005.

(30) Foreign Application Priority Data

Mar. 15, 2004 (KR) ............................. 10-2004-17363

(51) Int. Cl.
*F16M 11/04* (2006.01)
(52) U.S. Cl. .................. 248/176.3; 248/125.2; 248/920
(58) Field of Classification Search ................. 248/404, 248/276.1, 917, 919, 920, 921, 922, 923, 248/924, 663, 481, 181.1, 181.2, 288.31, 248/125.1, 125.2, 125.8, 126; 361/681, 682, 361/683; 267/64.16, 64.28, 131, 120, 121
See application file for complete search history.

(56) References Cited

U.S. PATENT DOCUMENTS

| 3,381,926 | A | 5/1968 | Fritz et al. |
| 4,678,295 | A | 7/1987 | Fisher |
| 6,108,195 | A | 8/2000 | Behl et al. |
| 6,173,936 | B1 | 1/2001 | Hegarty |
| 6,181,390 | B1 | 1/2001 | Wang et al. |
| 6,233,139 | B1 | 5/2001 | Hamon et al. |
| 6,268,997 | B1 | 7/2001 | Hong et al. |
| 6,276,655 | B1 | 8/2001 | Byoun et al. |
| 6,343,006 | B1 | 1/2002 | Moscovitch et al. |
| 6,381,125 | B1 | 4/2002 | Mizoguchi et al. |
| 6,478,275 | B1 | 11/2002 | Huang et al. |

(Continued)

FOREIGN PATENT DOCUMENTS

DK      3635920 C1    6/1988

(Continued)

*Primary Examiner*—Brian E. Glessner
*Assistant Examiner*—Bradley H Duckworth
(74) *Attorney, Agent, or Firm*—Birch, Stewart, Kolasch & Birch, LLP

(57) ABSTRACT

A monitor stand includes a base, a cylindrical housing located on the base, the housing having an opened top and bottom, and a packing assembly in the base for opening/closing the bottom of the housing. A piston is located in the housing, the piston being movable up/down. A first elastic member is located under the piston, for being compressed when the piston moves down. A bracket is located on a top of the piston, and a tilt/swivel adjusting device has one end fixedly secured to a front of the bracket, and the other end provided to a rear of the monitor. The tilt/swivel adjusting device permits the monitor to tilt forward/backward, or swivel left/right when an external force is applied.

31 Claims, 10 Drawing Sheets

U.S. PATENT DOCUMENTS

2002/0084389 A1   7/2002   Larson
2002/0141198 A1   10/2002  Yu et al.
2004/0004165 A1   1/2004   Hong et al.
2004/0035994 A1   2/2004   Cho et al.

FOREIGN PATENT DOCUMENTS

EP    1 577 600 A2    9/2005
JP    2002077775      3/2002

MONITOR STAND

CROSS-REFERENCE TO RELATED APPLICATION

This application is a Continuation of co-pending application No. 11/078,409 filed on Mar. 14, 2005, and for which priority is claimed under 35 U.S.C. § 120; and this application claims priority of Application No. P2004-0017363 filed in Korea on Mar. 15, 2004 under 35 U.S.C. § 119; the entire contents of all are hereby incorporated by reference.

BACKGROUND OF THE INVENTION

1. Field of the Invention

The present invention relates to a stand for supporting an image display device, such as a monitor.

2. Discussion of the Related Art

FIG. 1 illustrates a perspective view of a related art monitor stand. Referring to FIG. 1, the related art monitor stand is provided with a base 1, a movable column 2, and a hinge 5. The base 1 is placed on a floor, and the movable column 2 is movably mounted on the base 1 for movement in an up/down direction. The hinge 5 is mounted on top of the movable column 2 for tilting a monitor (not shown) in a front/rear direction.

A height of the monitor is adjusted by using the movable column 2, and a tilting angle of the monitor is adjusted by using the hinge 5. However, the related art monitor stand has several problems. First, the friction between the movable column 2 and the base 1 during height adjustment of the monitor generates much noise, and handling of the movable column 2 is not easy due to the weight of the monitor. Second, the hinge 5 has many components, such as a plurality of friction springs, or torsion springs, washers, nuts, and so on. Accordingly, much time is required for fabrication of the hinge.

SUMMARY OF THE INVENTION

Accordingly, the present invention is directed to a monitor stand that substantially obviates one or more problems due to limitations and disadvantages of the related art.

An object of the present invention is to provide a monitor stand which is easy to handle and fabricate. Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a monitor stand includes a base, a cylindrical housing located on the base, the housing having an opened top and bottom, a packing assembly in the base for opening/closing the bottom of the housing, a piston in the housing, the piston being movable up/down, a first elastic member under the piston, for being compressed when the piston moves down, a bracket on a top of the piston, and a tilt/swivel adjusting device having one end fixedly secured to a front of the bracket, and the other end provided to a rear of the monitor, for rotating the monitor in forward/backward or left/right directions when an external force is applied. The piston may have a rubber ring on an outside circumference for being in close contact with an inside surface of the housing, and the first elastic member may be a coil spring.

The tilt/swivel adjusting device includes first and second cylinders fixedly secured to an upper portion of the bracket, first and second rods having first ends horizontally movably inserted in the first and second cylinders respectively, and second ends coupled to a rear of the monitor, and a third supporting rod having one end fixedly secured to a lower portion of the bracket, and the other end coupled to the rear of the monitor. The first to third supporting rods include ball joints preferably made of metal at the other ends thereof, and the monitor includes sockets in the rear thereof for receiving the ball joints.

In a first embodiment, the packing assembly includes a lever rotatable up/down by an external force, a packing at one end of the lever for opening/closing the bottom of the housing, and a second elastic member secured to opposite sides of the lever, for returning the lever to an original position when the external force applied to the lever is removed. The lever includes a sidewardly projecting shaft, and the packing is hinged at one end of the lever. The packing may be formed of rubber, and the second elastic member may be a coil spring. The base includes a lower base having a space formed therein, the space having the packing assembly mounted therein, and an upper assembly having a hole making the bottom of the housing and the space in communication with one another.

In another embodiment, the packing assembly includes a packing movable in an up/down direction to open/close the bottom of the housing, a button movable forward/backward horizontally to engage with/disengage from the packing, and a third elastic member under the packing such that the third elastic member is compressed when the packing moves down. The base includes a step on an underside of an inside of the base, and the button includes a stopper on an upper surface so that the stopper is stopped at the step to prevent the button from falling off the base. The packing includes a notch in a lower portion for inserting the button therein. The notch includes a first slope at a lower portion, and the button includes a second slope for sliding on the first slope. The third elastic member may be a coil spring.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
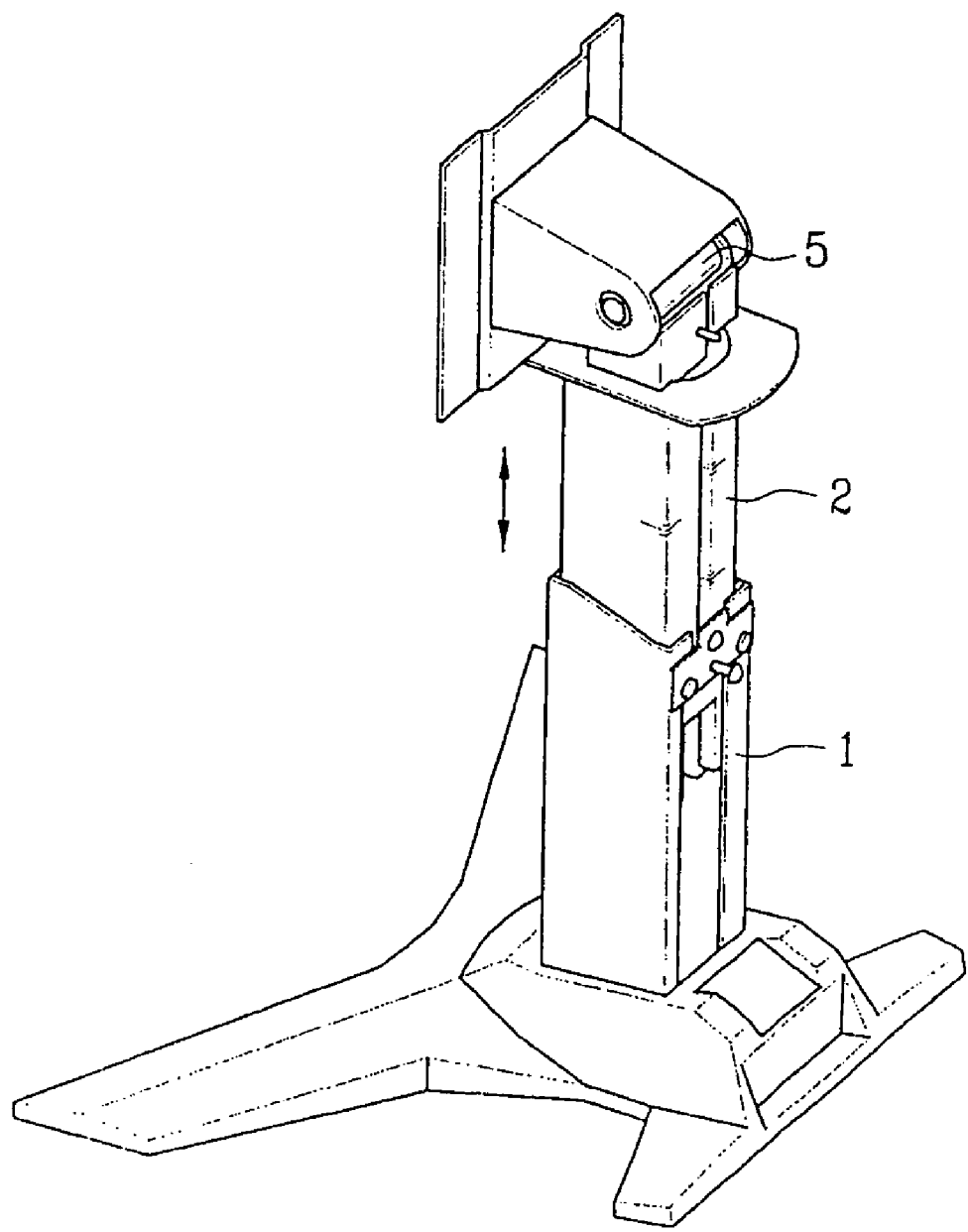
FIG. 1 illustrates a perspective view of a related art monitor stand.
Figure 2:
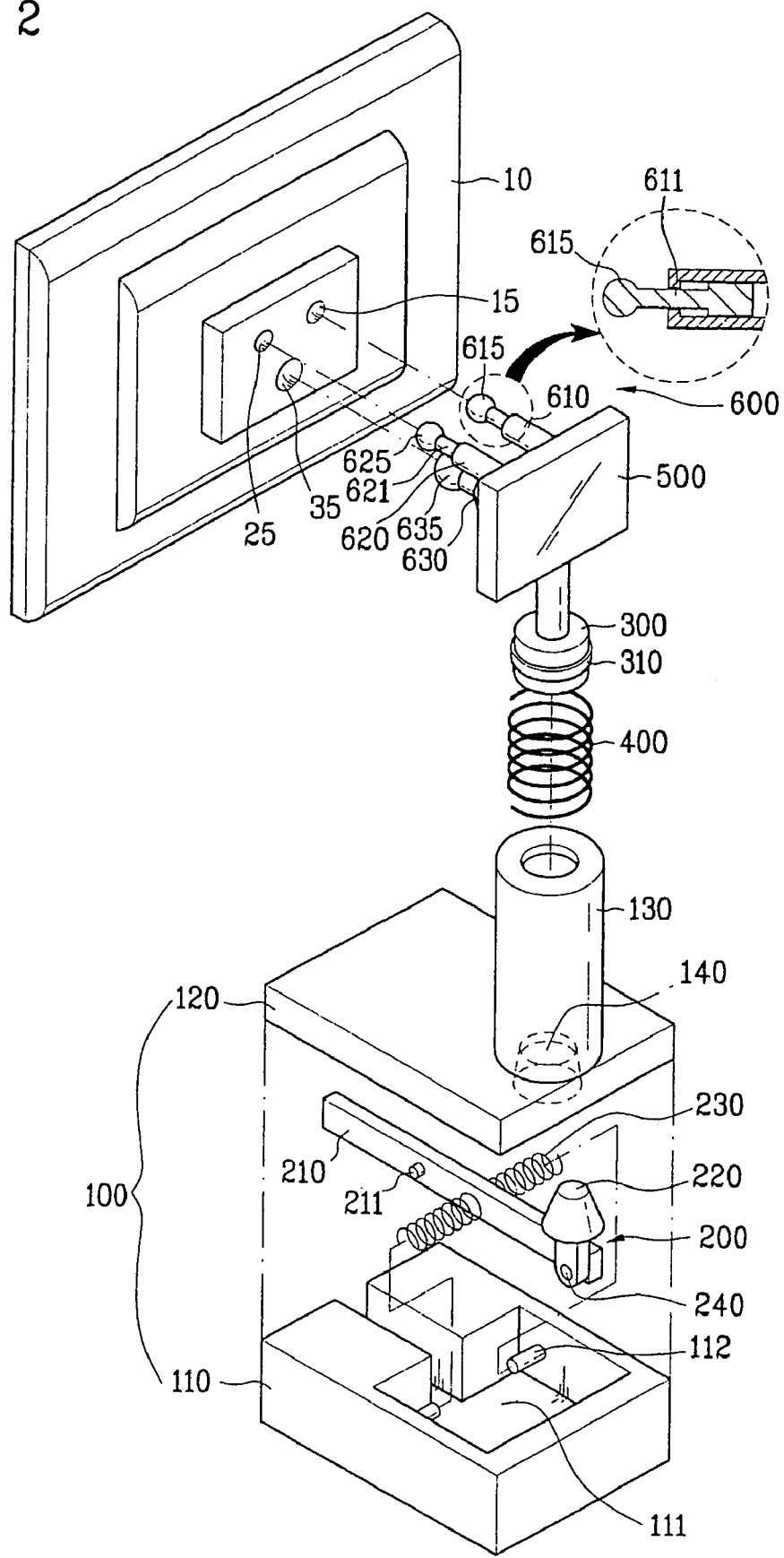
FIG. 2 illustrates an exploded perspective view of a monitor stand in accordance with a first preferred embodiment of the present invention.
Figure 3:
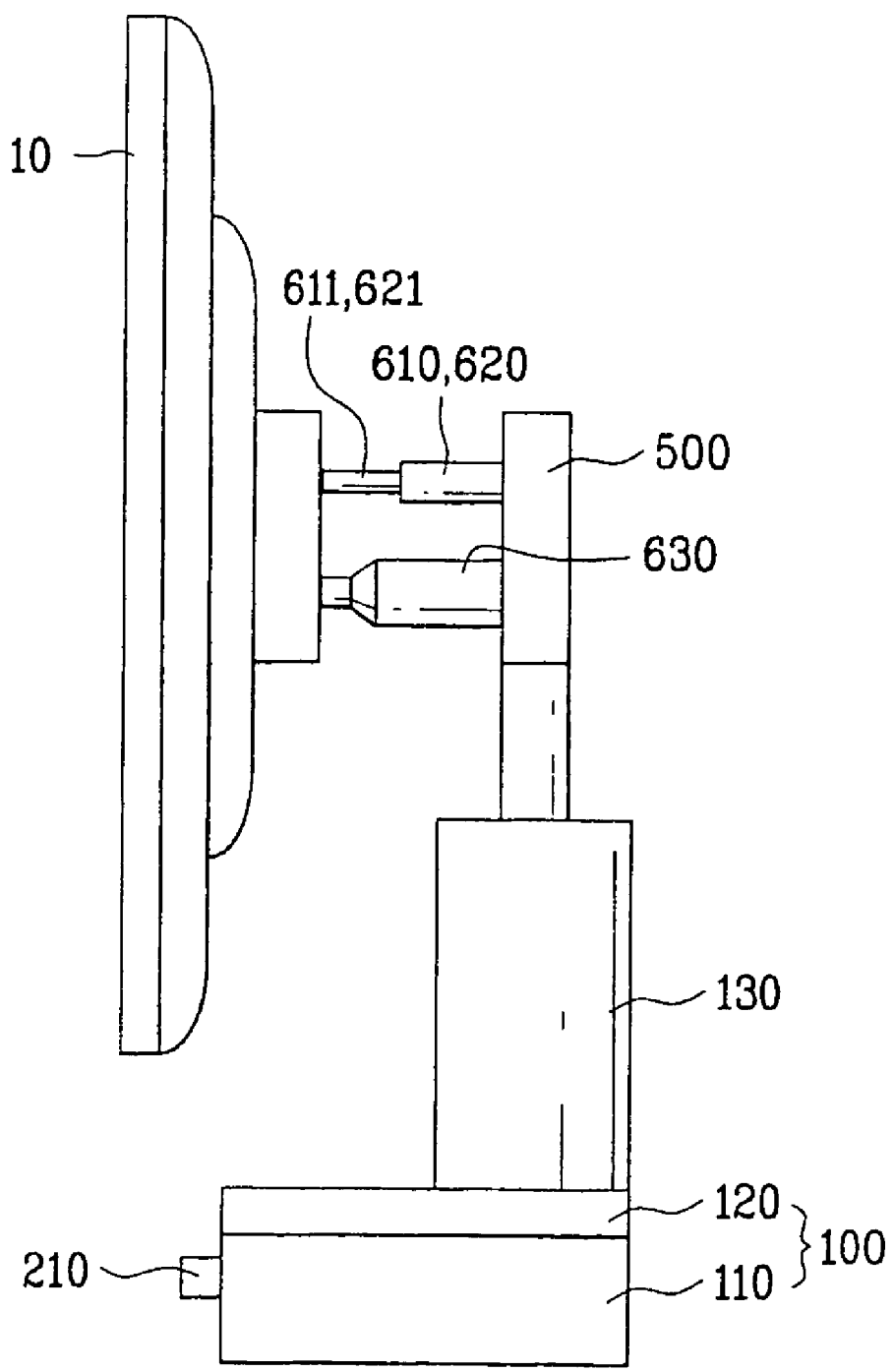
FIG. 3 illustrates a side view of the monitor stand in accordance with the first preferred embodiment of the present invention.
Figure 4:
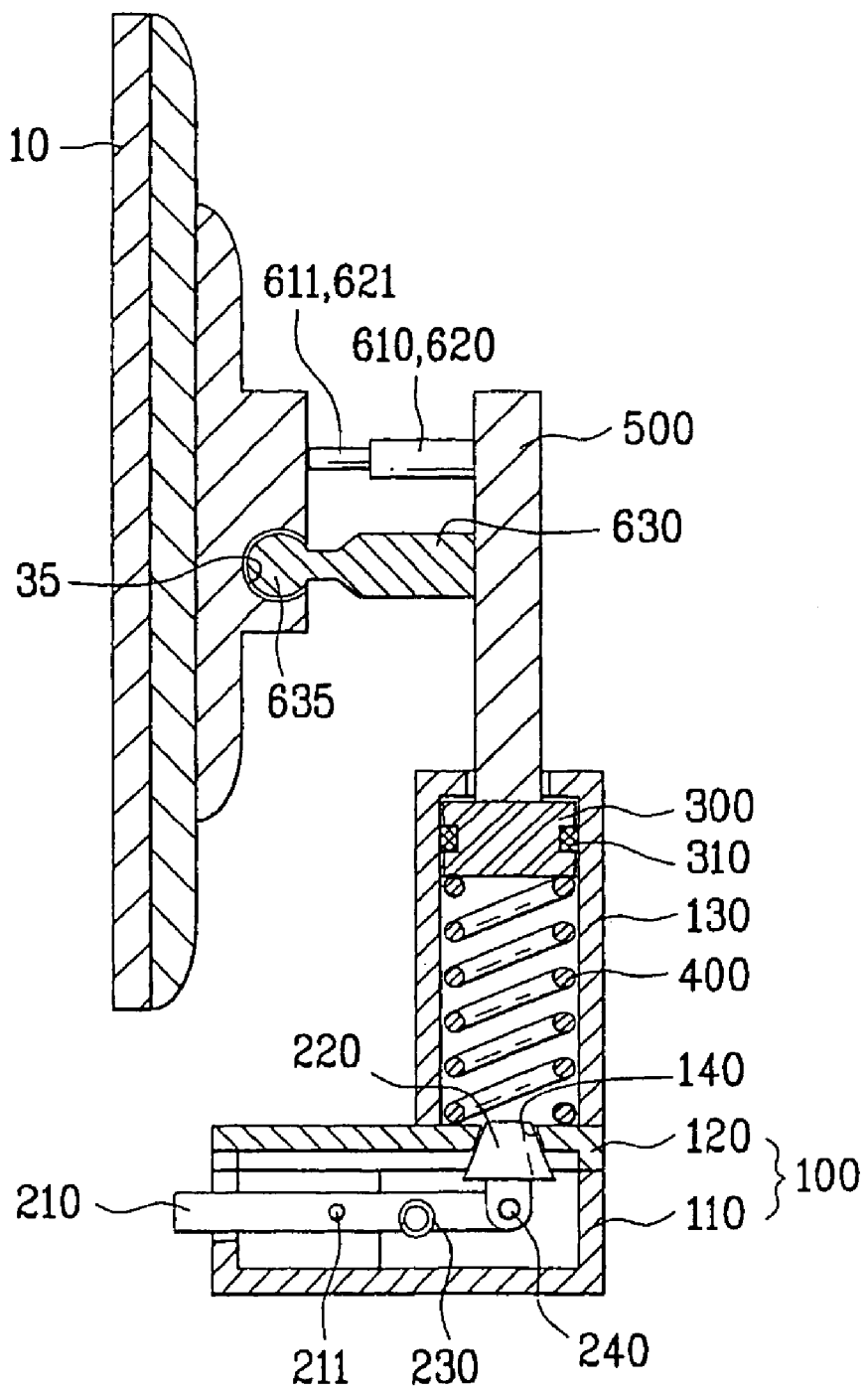
FIG. 4 illustrates a side sectional view of the monitor stand in accordance with the first preferred embodiment of the present invention.

Referring to FIGS. 2 to 4, the monitor stand includes a base 100, a housing 130, a packing assembly 200, a piston 300, a first elastic member 400, a bracket 500, and an orientation (tilt/swivel) adjusting device 600.

The base 100 may be placed on any horizontal surface, such as a desk, table or floor. The base 100 may be a stand-alone base, or may be part of another device, such as the lower keyboard portion of a laptop computer. The base 100 may or may not include supplemental weight(s) for stability of the stand when supporting a monitor 10. The housing 130 may be cylindrical, rectangular, or other shape with openings in the top and bottom, and is mounted on the base 100. The packing assembly 200 is located in the base 100, for closing/opening the opening in the bottom of the housing 130, thereby preventing/enabling air flow in/out of the housing 130.

The packing assembly 200 includes a lever 210 pivotally connected to the base 100 and movable by an external force. A packing 220 is located at one end of the lever 210 for opening/closing the opening in the bottom of the housing 130, and a second elastic members 230 is secured to opposite sides of the lever 210 for returning the lever 210 to an original position if the external force on the lever 210 is removed.

The lever 210 rotates around a shaft 211, and the packing 220 rotates together with the lever 210, for opening/closing the opening in the bottom of the housing 130. In the illustrated embodiments, the packing 220 is located below the opening in the bottom of the housing. However, alternatively, the packing 220 may be located inside of the housing 130 to open/close the opening from the top instead of the bottom, provided that the packing 220 is appropriately biased downwardly toward the opening.

It is preferable that the packing 220 is hinged at an end of the lever 210, for enabling opening/closing of the opening in the bottom of the housing 130 as the packing 220 rotates around a hinge 240 even if the packing 220 is misaligned with the opening in the bottom of the housing 130 because a length of the lever 210 is short/long. It is preferable that the packing 220 is formed of rubber for perfect sealing of the opening in the bottom of the housing 130. The second elastic member 230 is a coil spring that acts as a deflection spring, such as a leaf spring.

The base 100 includes a lower base 110 and an upper base 120 on the lower base 110. The lower base 110 has a space 111 formed therein for mounting the packing assembly 200 therein. The upper base 120 has a hole 140 for making the bottom of the housing 130 in communication with the space 111. The packing 220 is inserted in the hole 140 for opening/closing the opening in the bottom of the housing 130.

The space 111 has a slot (not shown) for receiving the shaft 211 on the side of the lever 210, and one pair of projections 112 for mounting the springs 230 thereon. In the embodiment shown, the springs 230 are coiled springs that act as cantilevered leaf springs to provide a deflection-type restoring force to the lever 210. Alternatively, a torsion-type spring located about shaft 211 may be used to provide a restoring force to the lever 210.

A piston 300 is mounted in the housing 130 so as to be movable in a vertical direction. The piston 300 moves up/down in the housing 130, to adjust the height of the monitor 10. It is preferable that the piston 300 has a rubber ring 310 on an outside circumferential surface, for being in a close contact with an inside surface of the housing 130. The rubber ring 310 seals a gap between the piston 300 and the housing 130 for preventing air from leaking past the piston 300. Alternatively, the piston 300 itself may be formed of rubber, or of Teflon with a good anti-abrasion property, or a self-lubricating material.

The first elastic member 400 under the piston 300 is compressed when the piston 300 moves down. That is, the first elastic member 400 deforms elastically following up/down movement of the piston 300, to apply an upward force to the piston 300. The first elastic member 400 is preferably a coil spring, although other compressible elastic elements may be used. Alternatively, instead of forming the first elastic member 400 as a compression spring located between the bottom of the piston 300 and the hole in the bottom of the housing 130 to bias the piston 300 upward, the first elastic member 400 may be a tension spring device located between the top of the piston 300 and the top of the housing 130 to similarly bias the piston 300 upward.

The bracket 500 is located at a top of the piston 300, and the tilt/swivel adjusting device 600 is mounted between the bracket 500 and the monitor 10. Because the piston 300 and cylinder of the housing 130 are preferably cylindrical, the piston 300 with the attached bracket 500 may rotate about the vertical axis of the piston 300, thereby permitting rotation of the monitor 10. The tilt/swivel adjusting device 600 has one end secured to a front of the bracket 500, and the other end is secured at a rear of the monitor 10, so that the monitor 10 may tilt in forward/backward directions, or swivel in left/right directions. As used herein, tilt refers to the forward/backward rotation of the monitor 10, and swivel refers to the left/right rotation of the monitor 10.

The tilt/swivel adjusting device 600 includes first and second cylinders 610 and 620, and first, second, and third supporting rods 611, 621, and 630. The first and second cylinders 610 and 620 are fixedly secured to an upper portion of the bracket 500. The first and second supporting rods 611 and 621 have first ends inserted in the first and second cylinders 610 and 620 respectively, so as to move horizontally, and second ends coupled to the rear of the monitor 10. The third supporting rod 630 has a first end fixedly secured to a lower portion of the bracket 500, and a second end coupled to the rear of the monitor 10.

Accordingly, upon application of a force to the monitor 10, the first and second supporting rods 611 and 621 slide along insides of the first and second cylinders 610 and 620, respectively, while the third supporting rod 630 does not move, but maintains a fixed state. The monitor 10 rotates in forward/backward or left/right directions around the third supporting rod 630 as the first and second supporting rods 611 and 621 move horizontally along the insides of the first and second cylinders 610 and 620.

The first, second, and third supporting rods 611, 621, and 630 also have ball joints 615, 625, and 635 preferably made of metal at the other ends respectively, and the monitor 10 has sockets 15, 25, and 35 for inserting the ball joints 615, 625, and 635 of the first, second, and third supporting rods 611, 621, and 630 therein, respectively. The ball joints 615, 625, and 635 make a spherical motion within the sockets 15, 25, and 35 respectively when the monitor 10 moves forward/backward, or left/right. Accordingly, the ball joints 615, 625, and 635 enable smooth rotation of the monitor 10.

Although the present invention has been described using one fixed supporting rod 630 and two sliding supporting rods 611 and 621, it should be understood that the number of sliding supporting rods is not limited to two, but may be more or fewer. For example, the apparatus may include no sliding supporting rods at all, and instead be fully supported by the fixed supporting rod 630. In addition to permitting tilting and swiveling of a display attached to the bracket 500, such an arrangement would additionally permit the display to rotate from, for example, a landscape orientation to a portrait orientation, about the ball 635 and socket 35 joint. Alternatively, the apparatus may include only one sliding supporting rod (such as 621) in addition to the fixed supporting rod 630. Such an arrangement would still permit tilting and swiveling of a display attached to the bracket 500, but would restrict the display from rotating between a landscape orientation and a portrait orientation.

Figure 5A:
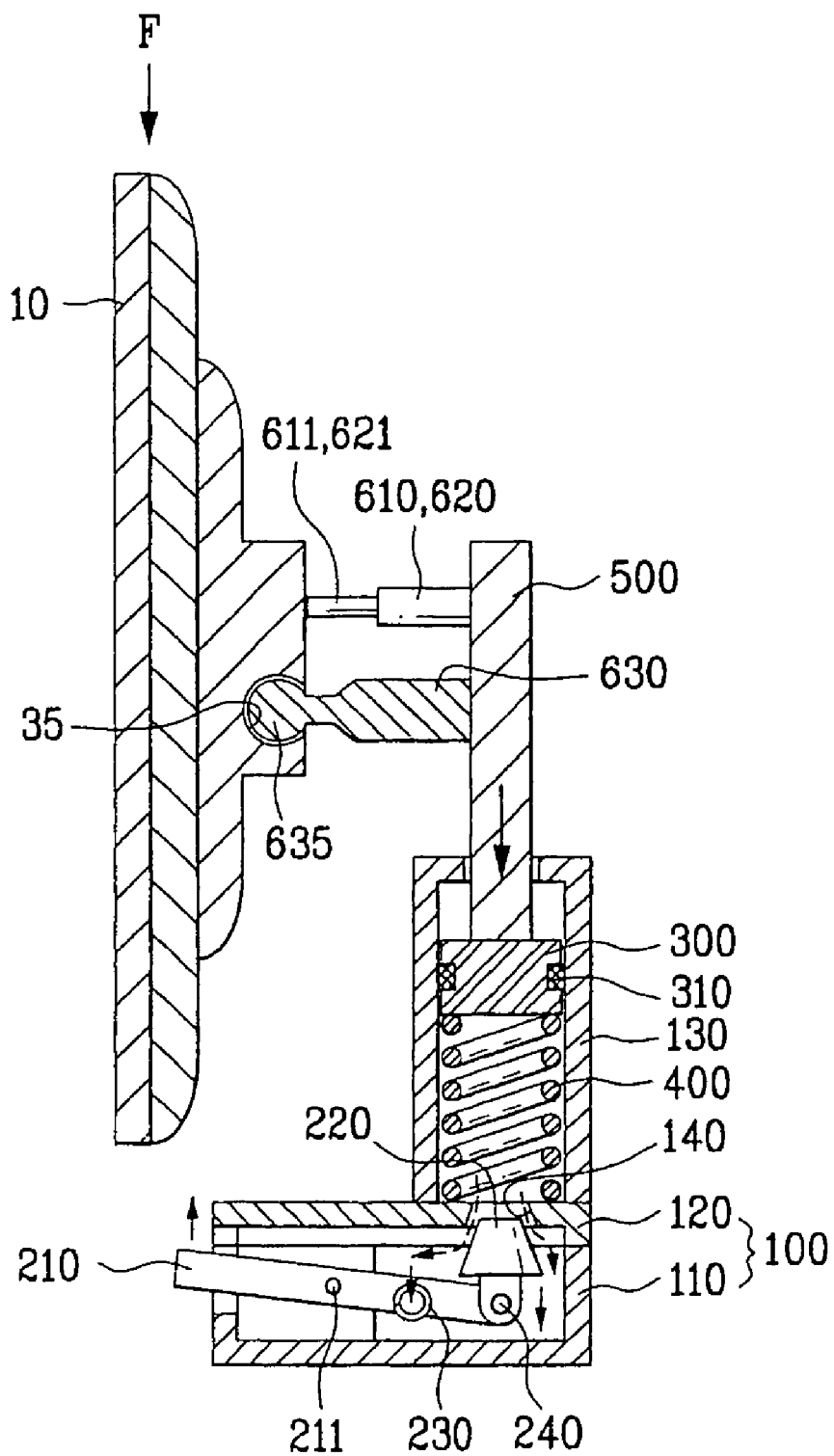
FIGS. 5A~5C illustrate side sectional views of the monitor stand in accordance with the first preferred embodiment of the present invention, showing the steps for adjusting a height of the monitor.
Figure 5B:
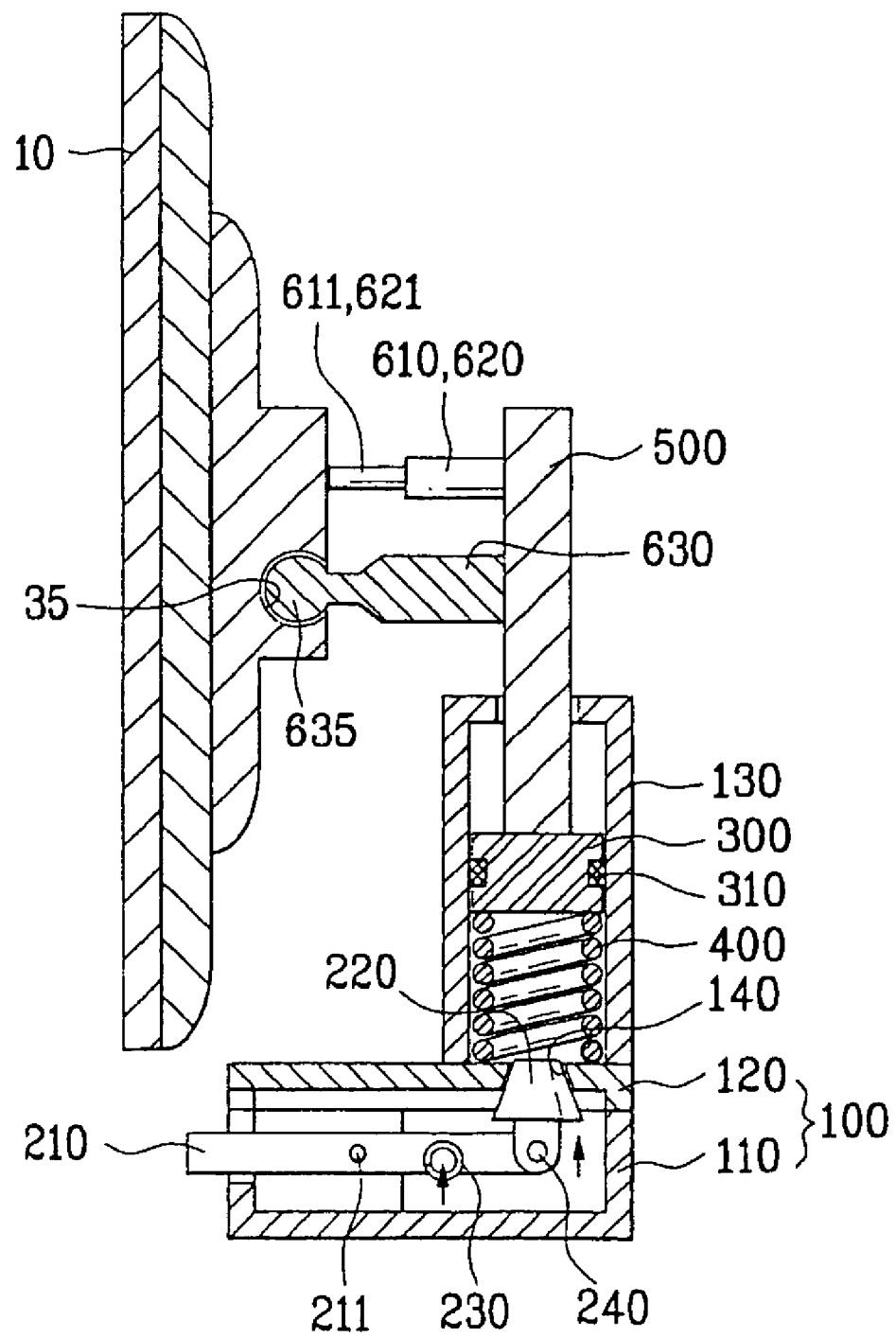
Figure 5C:
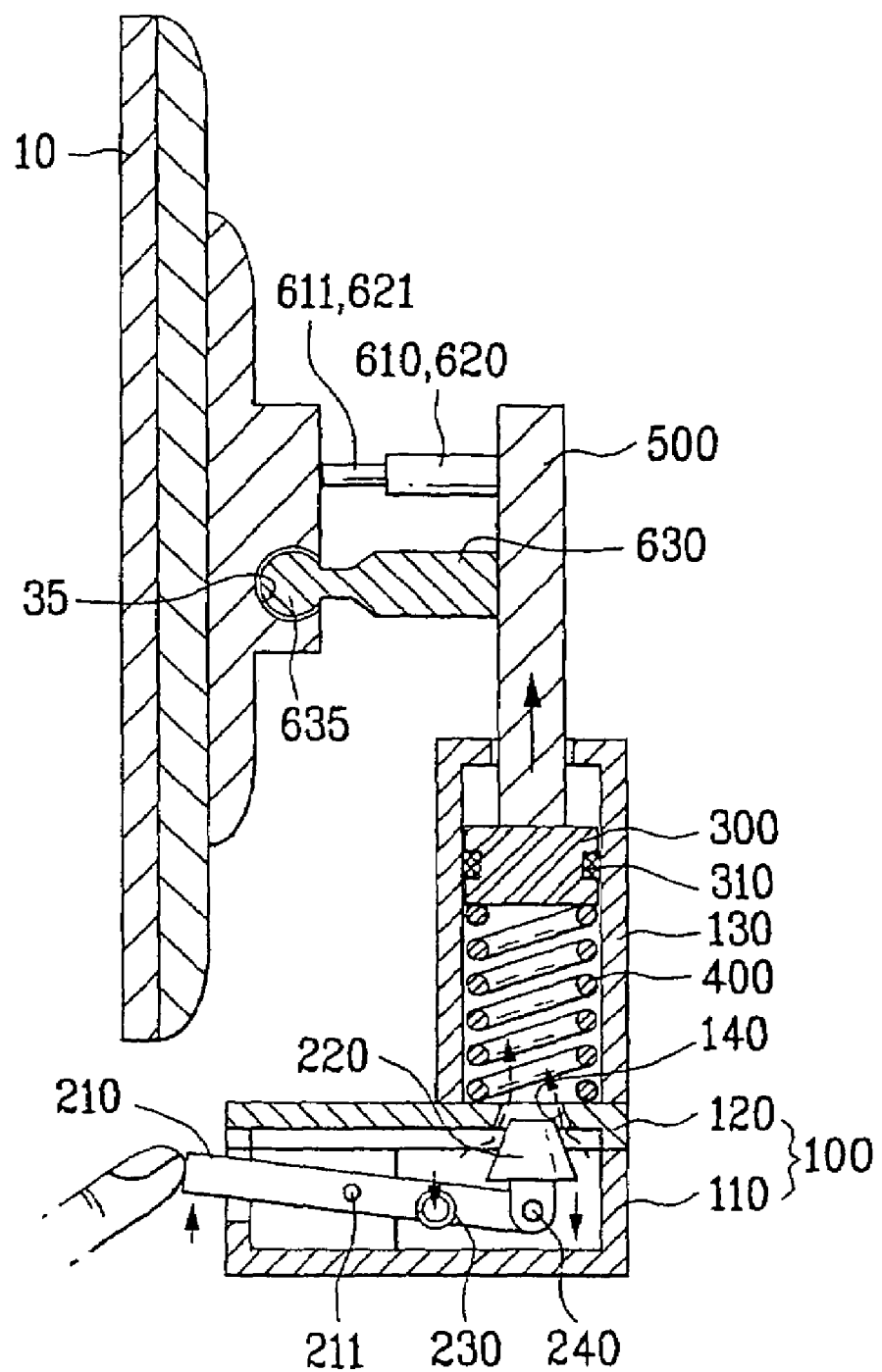

The operation of the monitor stand in accordance with a first preferred embodiment of the present invention will now be described. FIGS. 5A~5C illustrate side sectional views of a monitor stand in accordance with a first preferred embodiment of the present invention, showing the steps of a process for adjusting a height of the monitor.

Referring to FIG. 5A, when it is intended to lower a height of the monitor 10, the user presses down the monitor 10 or the bracket 500, to move the monitor 10 down. This causes the piston 300 to move down along an inside of the housing 130, to compress the first elastic member 400. In this instance, since air cannot pass through a gap between the piston 300 and the housing 130 because of the rubber ring 310 on the outside circumference of the piston 300, air in the housing 130 is also compressed. The compressed air pushes out the packing 220, to open the bottom of the housing 130, through which the compressed air escapes from the inside of the housing 130.

Thereafter, referring to FIG. 5B, when the user removes the pressing force as the monitor 10 reaches a desired height, the packing 220 moves up and closes the opening in the bottom of the housing 130 by the elastic force of the second elastic member 230. In this instance, since the inside of the housing 130 is sealed, even if the piston 300 has an upward force applied thereto from the first elastic member 400, the piston 300 does not move. That is, even if a restoring force of the first elastic member 400 exerts an upward force on the piston, a sealed vacuum space under the piston 300 prevents upward movement of the piston 300.

Referring to FIG. 5C, if it is intended to raise the height of the monitor upward, the user lifts the lever 210 upward, so that the packing 220 hinged at one end of the lever 210 rotates downward around the shaft 211, to open the bottom of the housing 130, and allow introduction of air into the inside of the housing 130. As the air is introduced into the inside of the housing 130, the first elastic member 400 pushes up the piston 300. When the piston 300 moves upward, the bracket 500 and the monitor 10 coupled to the piston 300 also move up.

When the user releases the lever 210 as the monitor 10 reaches a desired height, the lever 210 rotates, and returns to an original position by the restoring force of the second elastic member 230. In this instance, the packing 220 also moves together with the lever 210, to close the bottom of the housing 130 again. Accordingly, the inside of the housing 130 is sealed again, to prevent the monitor 10 from moving upward.

Figure 6A:
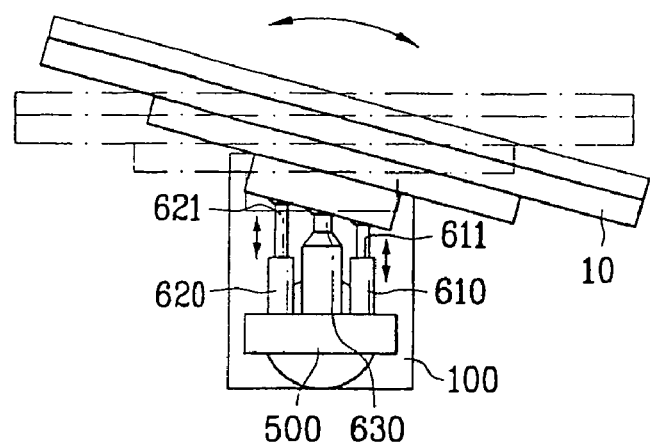
FIG. 6A illustrates a side view showing swiveling of the monitor.
Figure 6B:
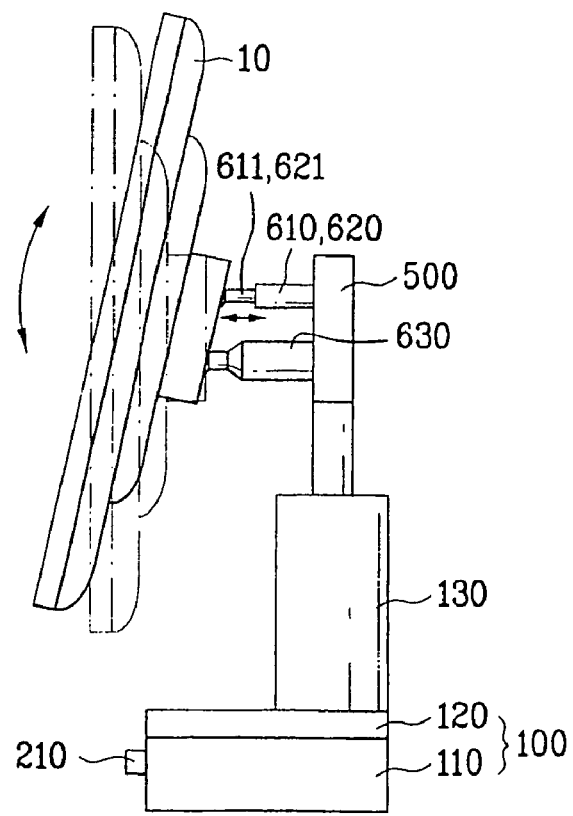
FIG. 6B illustrates a side view showing tilting of the monitor.

FIG. 6A illustrates a side view showing swiveling of a monitor, and FIG. 6B illustrates a side view showing tilting of a monitor. Referring to FIGS. 6A and 6B, the tilt/swivel of the monitor 10 occurs as the first supporting rod 611 and the second supporting rod 621 move horizontally along the first cylinder 610 and the second cylinder 620, respectively. That is, upon application of an external force, lengths of the first and second supporting rods 611 and 621 exposed from the first and second cylinders 610 and 620 change, to move the monitor 10 forward/backward or left/right. In this instance, the monitor 10 rotates forward/backward or left/right around the third supporting rod 630 that has no length change. The ball joints 615, 625, and 635 (see FIG. 2) at the first, second, and third supporting rods 611, 621, and the 630 enable smooth rotation of the monitor 10.

Figure 7:
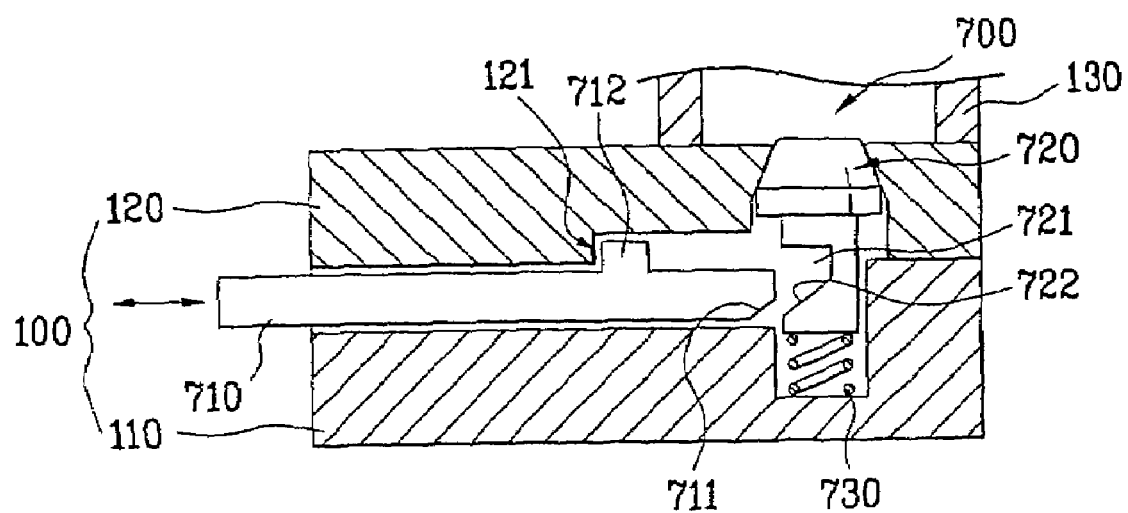
FIG. 7 illustrates a section of a monitor stand in accordance with a second preferred embodiment of the present invention.

FIG. 7 illustrates a section of a monitor stand in accordance with a second preferred embodiment of the present invention. Referring to FIG. 7, the monitor stand includes a packing assembly 700 having a packing 720, a button 710, and a third elastic member 730. The packing moves up/down to open/close the opening in the bottom of the housing 130, and the button 710 moves forward/backward to engage with the packing 720.

The packing 720 has a notch 721 in a lower portion for receiving the button 710 therein. The notch 721 has a first slope 722 in a lower portion, and the button 710 has a second slope 711 for sliding along the first slope 722. The first and second slopes 722 and 711 reduce friction between the button 710 and the packing 720, such that the button 710 smoothly moves into or moves away from the notch 721.

The third elastic member 730 under the packing 720 is compressed when the packing 720 moves down. That is, the third elastic member 730 is compressed when the packing 720 is moved down by an external force, and is restored to an original position when the external force is removed, to return the packing 720 to an original position. The third elastic member 730 is preferably a coil spring.

A step 121 is located on an inside of the base 100, and the button 710 has a stopper 712 on an upper surface so that the stopper 712 is stopped at the step 121 to prevent the button 710 from falling off the base 100. Accordingly, inadvertent disassembly of the button 710 from the base 100 during assembly or transportation of the monitor 10 for packaging can be prevented. In more detail, the step 121 is located on an underside surface of the upper base 120.

Figure 8A:
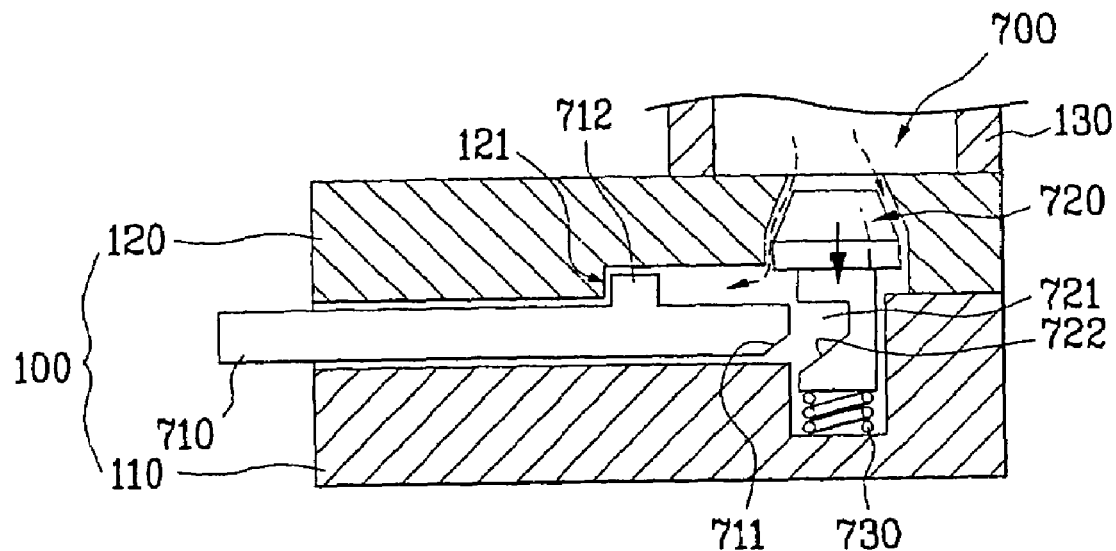
FIGS. 8A and 8B illustrate sections of the monitor stand in accordance with the second preferred embodiment of the present invention, showing the steps for adjusting a height of a monitor.
Figure 8B:
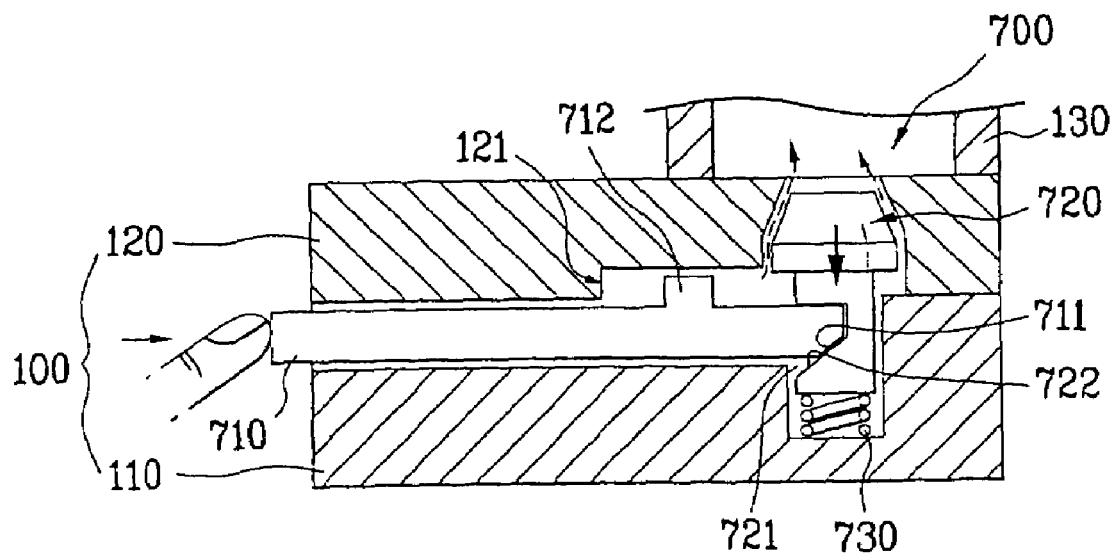

The operation of the monitor stand in accordance with the second preferred embodiment of the present invention will now be described. FIGS. 8A and 8B illustrate sections of a monitor stand in accordance with the second preferred embodiment of the present invention, showing the steps of a process for adjusting a height of the monitor.

As described before, when it is intended to lower a height of the monitor 10, the user presses down the monitor 10 or the bracket 500 with a force F, to move the monitor 10 down (see FIG. 5A). Accordingly, the piston 300 moves down along an inside of the housing 130, to compress the first elastic member 400, and compress air inside of the housing 130. In this instance, referring to FIG. 8A, the compressed air makes the packing 720 move down, to open the bottom of the housing 130, and the compressed air escapes from the inside of the housing 130 through the opened bottom of the housing 130. In this instance, the third elastic member 730 is compressed as the packing 720 moves down.

When the user removes the downward pressing force as the monitor 10 reaches a desired height, the packing 720 moves upward by the restoring force of the third elastic member 730, until the packing 720 closes the bottom of the housing 130. In this instance, an inside space of the housing 130 under the piston 300 is sealed, and the piston 300 does not move.

On the other hand, referring to FIG. 8B, when it is intended to raise a height of the monitor 10, the user pushes the button 710. In this instance, the button 710 is inserted in the notch 721 in the packing 720, to move the packing 720 downwardly to compress the third elastic member 730 and open the bottom of the housing 130, allowing air to be introduced into the inside of the housing 130. As the air is introduced into the inside of the housing 130, the first elastic member 400 moves the piston 300 upward. As the piston 300 moves up, the monitor 10 also moves up.

If the user removes his/her hand from the button 710 as the monitor 10 reaches a desired height, the packing 720 moves upward by the restoring force of the third elastic member 730. In this instance, the button 710 moves away from the notch 721 as the second slope 711 slides on the first slope 722. Then, the packing 720 moves upward by the third elastic member 730, to close the bottom of the housing 130. At the end, the inside space of the housing 130 is sealed to prevent the piston 300 from moving upward.

As has been described, the monitor stand has several advantages. First, the height adjustment of the monitor is made easier by the present invention, which enhances product satisfaction of the user. Second, since the hinge can be dispensed with for monitor tilt/swivel, the time required for fabrication of the hinge is saved, and an overall assembly process becomes easier.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A stand for an image display device, the stand comprising:
   a bracket for receiving the image display device;
   a piston fixed to said bracket;
   a housing for adjusting a display height of the image display device, said housing including:
      an upper end receiving said piston,
      a bottom end communicating with the upper end, and
      an opening formed in the bottom end,
      wherein said piston is biased toward the upper end; and
   a packing assembly for selectively sealing the opening of said housing,
   wherein said piston forms a seal with an inner surface of said housing such that, when said packing assembly seals the opening of said housing, movement of said piston upward within said housing generates a vacuum inside said housing.

2. The stand as claimed in claim 1, said packing assembly comprising: packing; and
   a device for moving said packing in response to an external force,
   wherein said packing is extracted from the opening of said housing when the external force is applied to said device and wherein said packing is seated in the opening of said housing when the external forced applied to said device is removed.

3. The stand as claimed in claim 2, wherein said device is a lever engaging with said packing via a pivoting motion.

4. The stand as claimed in claim 2, wherein said device is a button that selectively engages with said packing via a sliding motion.

5. The stand as claimed in claim 2, wherein said device is biased toward an original position, such that the original position of said device is attained when there is no external force applied to said device, and wherein said packing is seated in the opening of said housing when said device is the original position.

6. The stand as claimed in claim 2, further comprising:
   a spring for applying a restoring force to said device.

7. The stand as claimed in claim 2, further comprising:
   a spring for applying a restoring force to said packing.

8. The stand as claimed in claim 1, said packing assembly comprising:
   packing; and
   a lever for moving said packing in response to an external force,
   wherein said packing is extracted from the opening of said housing when the external force is applied to said lever and wherein said packing is seated in the opening of said housing when the external forced applied to said lever is removed.

9. The stand as claimed in claim 8, further comprising:
   a hinge, coupled to said packing and to one end of said lever, for enabling self-alignment of said packing with respect to the opening of said housing during operation of said lever.

10. The stand as claimed in claim 1, said packing assembly comprising:
    packing; and
    a button for moving said packing in response to an external force,
    wherein said packing is extracted from the opening of said housing when the external force is applied to said button and wherein said packing is seated in the opening of said housing when the external forced applied to said button is removed.

11. The stand as claimed in claim 10, wherein said button is selectively engaged with said packing and wherein movement of said button moves said packing orthogonally.

12. The stand as claimed in claim 11, said button comprising:
    a sloping surface for engaging with a complementary surface of said packing, said sloping surface sliding on the complementary surface of said packing when said button engages with said packing.

13. The stand as claimed in claim 1, further comprising:
    an elastic member biasing said piston, said elastic member being configured as at least one of a compression spring disposed below said piston and a tension spring disposed above said piston.

14. The stand as claimed in claim 13, wherein said elastic member generates a biasing force sufficient to raise said piston, said bracket, and the image display device.

15. The stand as claimed in claim 1, wherein downward movement of said piston is achieved by applying to at least one of said bracket and the image display device an external force overcoming the biasing of said piston.

16. The stand as claimed in claim 1, wherein operation of said packing assembly selectively releases the vacuum of said housing.

17. The stand as claimed in claim 1, further comprising:
a base coupled to said housing to form a space communicating with the opening of said housing.

18. The stand as claimed in claim 17, wherein said packing assembly is installed in the space of said base.

19. The stand as claimed in claim 1, wherein said packing assembly is installed in said housing.

20. The stand as claimed in claim 1, further comprising:
an orientation adjusting device for adjusting a display angle of the image display device with respect to said bracket.

21. The stand as claimed in claim 20, wherein said orientation adjusting device permits a tilting of the image display device about a substantially horizontal axis in response to an external force.

22. The stand as claimed in claim 20, wherein said orientation adjusting device permits a swiveling of the image display device about a substantially vertical axis in response to an external force.

23. The stand as claimed in claim 20, said orientation adjusting device comprising:
a first cylinder fixed to said bracket at a first point;
a first rod, slidably movable within said first cylinder, for receiving the image display device; and
a fixed rod, fixed to said bracket at a second point, for receiving the image display device.

24. The stand as claimed in claim 23, wherein each of said first rod and said fixed rod has one end including a ball forming pad of a ball-and-socket joint for enabling a pivoting of the image display device.

25. The stand as claimed in claim 23, said orientation adjusting device further comprising:
a second cylinder fixed to said bracket at a third point; and
a second rod, slidably movable within said second cylinder, for receiving the image display device.

26. The stand as claimed in claim 25, wherein said second rod has one end including a ball forming part of a ball-and-socket joint for enabling a pivoting of the image display device.

27. The stand as claimed in claim 20, wherein said orientation adjusting device further permits swiveling of said bracket about a substantially vertical axis in response to an external force.

28. An image display device including a monitor stand, the image display device comprising:
a bracket coupled to the image display device;
a piston fixed to said bracket;
a housing for adjusting a display height of the image display device, said housing including:
an upper end receiving said piston,
a bottom end communicating with the upper end, and
an opening formed in the bottom end,
wherein said piston is biased toward the upper end;
a base coupled to said housing to form a space communicating with the opening of said housing; and
a packing assembly, installed in the space of said base, for selectively sealing the opening of said housing, wherein said piston forms a seal with an inner surface of said housing such that, when said packing assembly seals the opening of said housing, movement of said piston upward within said housing generates a vacuum inside said housing.

29. A stand for an image display device, the stand comprising:
a bracket for receiving the image display device;
an orientation adjusting device for permitting simultaneous tilting and swiveling of the image display device about substantially horizontal and vertical axes, respectively, to adjust a display angle of the image display device with respect to said bracket in response to an external force, said orientation adjusting device comprising:
first and second cylinders respectively fixed to said bracket,
first and second rods slidably movable with the first and second cylinder, respectively, and
a fixed rod fixed to said bracket at a point equidistant from each of the first and second cylinders, the fixed road having a fixed length of extension from said bracket,
wherein each of the first and second rods extends from a corresponding cylinder to a distance relative to the fixed length of the fixed rod, based on the adjusted display angle of the image display device,
wherein each of the first rod, the second rod, and the fixed rod has one end including a ball forming part of a ball-and-socket joint for enabling a pivoting of the image display device so that, when the image display device is tilted about the substantially horizontal axis only, the first and second rods extend equal distances from the corresponding cylinder and so that, when the image display device is swiveled about the substantially vertical axis only, the first and second rods extend complementary distances from the corresponding cylinder,
wherein said orientation adjusting device is coupled to a piston fixed to said bracket and engaged with a housing for adjusting a display height of the image display device and wherein said orientation adjusting device further permits a swiveling of said bracket about a substantially vertical axis in response to an external force, and
wherein said piston forms a seal with an inner surface of said housing such that, when said packing assembly seals the opening of said housing, movement of said piston upward within said housing generates a vacuum inside said housing.

30. A stand for an image display device, the stand comprising:
a bracket for receiving the image display device;
an orientation adjusting device for permitting simultaneous tilting and swiveling of the image display device about substantially horizontal and vertical axes, respectively, to adjust a display angle of the image display device with respect to said bracket in response to an external force, said orientation adjusting device comprising:
first and second cylinders respectively fixed to said bracket,
first and second rods slidably movable with the first and second cylinder, respectively, and
a fixed rod fixed to said bracket at a point equidistant from each of the first and second cylinders, the fixed road having a fixed length of extension from said bracket,
wherein each of the first and second rods extends from a corresponding cylinder to a distance relative to the fixed length of the fixed rod, based on the adjusted display angle of the image display device, and
wherein each of the first rod, the second rod, and the fixed rod has one end including a ball forming part of a ball-and-socket joint for enabling a pivoting of the image display device so that, when the image display device is tilted about the substantially horizontal axis only, the first and second rods extend equal distances firm the corresponding cylinder and so that, when the image display device is swiveled about the substantially vertical axis only, the first and second rods extend complementary distances from the corresponding cylinder;

a piston fixed to said bracket;

a housing for adjusting a display height of the image display device, said housing including:

an upper end receiving said piston, a bottom end communicating with the upper end, and an opening formed in the bottom end, wherein said piston is biased toward the upper end; and a packing assembly for selectively sealing the opening of said housing, wherein said piston forms a seal with an inner surface of said housing such that, when said packing assembly seals the opening of said housing, movement of said piston upward within said housing generates a vacuum inside said housing.

31. A stand for an image display device, the stand comprising:

a bracket for receiving the image display device;

an orientation adjusting device for permitting simultaneous tilting and swiveling of the image display device about substantially horizontal and vertical axes, respectively, to adjust a display angle of the image display device with respect to said bracket in response to an external force, said orientation adjusting device comprising:

first and second cylinders respectively fixed to said bracket, first and second rods slidably movable with the first and second cylinder, respectively, and a fixed rod fixed to said bracket at a point equidistant firm each of the first and second cylinders, the fixed road having a fixed length of extension from said bracket, wherein each of the first and second rods extends from a corresponding cylinder to a distance relative to the fixed length of the fixed rod, based on the adjusted display angle of the image display device, wherein each of the first rod, the second rod, and the fixed rod has one end including a ball forming part of a ball-and-socket joint for enabling a pivoting of the image display device so that, when the image display device is tilted about the substantially horizontal axis only, the first and second rods extend equal distances from the corresponding cylinder and so that, when the image display device is swiveled about the substantially vertical axis only, the first and second rods extend complementary distances from the corresponding cylinder, wherein said bracket has a display side facing the image display device, wherein said orientation adjusting device is disposed between the display side of said bracket and the image display device, wherein the first an second cylinders protrude from the display side of said bracket, wherein each of the first and second rods is variably inserted into the corresponding cylinder based on the adjusted display angle of the image display device, and wherein the first and second rods remain fully between the display side of said bracket and the image display device when either of the first and second rods fully inserted into the corresponding cylinder.

\* \* \* \* \*